(12) United States Patent
Callens et al.

(10) Patent No.: US 10,967,541 B2
(45) Date of Patent: Apr. 6, 2021

(54) UNIT AND METHOD FOR THE PRODUCTION OF THERMOPLASTIC COMPOSITE PREFORMS

(71) Applicant: CENTRE TECHNIQUE DES INDUSTRIES MÉCANIQUES, Senlis (FR)

(72) Inventors: Clément Callens, Ligné (FR); Franck Bordellier, Sainte-Luce-sur-Loire (FR); Philippe Capon, Châlon-sur-Saône (FR)

(73) Assignee: CENTRE TECHNIQUE DES INDUSTRIES MECHANIQUES

( * ) Notice: Subject to any disclaimer, the term of this patent is extended or adjusted under 35 U.S.C. 154(b) by 318 days.

(21) Appl. No.: 15/573,854

(22) PCT Filed: Jun. 13, 2016

(86) PCT No.: PCT/FR2016/051429
§ 371 (c)(1),
(2) Date: Nov. 14, 2017

(87) PCT Pub. No.: WO2016/198813
PCT Pub. Date: Dec. 15, 2016

(65) Prior Publication Data
US 2018/0257263 A1   Sep. 13, 2018

(30) Foreign Application Priority Data
Jun. 12, 2015 (FR) .................................... 1555399

(51) Int. Cl.
*B29B 11/04* (2006.01)
*B29C 70/38* (2006.01)
*B29B 11/16* (2006.01)

(52) U.S. Cl.
CPC .............. *B29B 11/04* (2013.01); *B29B 11/16* (2013.01); *B29C 70/38* (2013.01); *C08J 2300/22* (2013.01)

(58) Field of Classification Search
USPC ......................................................... 493/393
See application file for complete search history.

(56) References Cited

U.S. PATENT DOCUMENTS 6,009,605 A * 1/2000 Olry ........................ B29B 11/16
28/107
6,287,678 B1 * 9/2001 Spengler ................. B32B 27/32
428/297.4

(Continued)

FOREIGN PATENT DOCUMENTS

DE  10 2011 054 650 A1  4/2013
DE  10 2012 111 761 A1  6/2014

(Continued)

OTHER PUBLICATIONS

International Search Report dated Oct. 10, 2016 in corresponding PCT International Application No. PCT/FR2016/051429.

(Continued)

*Primary Examiner* — Anna K Kinsaul
*Assistant Examiner* — Chinyere J Rushing-Tucker
(74) *Attorney, Agent, or Firm* — Ostrolenk Faber LLP

(57) ABSTRACT

A production of thermoplastic composite preforms intended to be thermoformed. The unit including: a movable support and a plurality of storage areas for storing a plurality of structural elements made from thermoplastic composite material; and transfer and connection devices for transferring the structural elements to the movable support and connecting the structural elements to one another. The movable support is driven sequentially in translation in a direction of travel, while the storage areas are arranged laterally in relation to the movable support. The transfer and (Continued)

connection devices transfer the structural elements to the movable support along a transfer direction substantially perpendicular to the direction of travel.

12 Claims, 2 Drawing Sheets

(56) References Cited

U.S. PATENT DOCUMENTS

| | | | | |
|---|---|---|---|---|
| 2007/0241478 | A1* | 10/2007 | Buckley | B29B 11/16 264/257 |
| 2013/0126067 | A1* | 5/2013 | Regan | B25J 15/0675 156/64 |
| 2013/0306233 | A1* | 11/2013 | Pini | B29B 11/16 156/256 |
| 2015/0174832 | A1* | 6/2015 | Wollenweber | B29C 70/34 156/297 |
| 2015/0336329 | A1* | 11/2015 | Lehmann | B29B 11/16 156/73.1 |

FOREIGN PATENT DOCUMENTS

| | | |
|---|---|---|
| EP | 1 990 169 A1 | 11/2008 |
| WO | WO 2013/016487 A1 | 1/2013 |

OTHER PUBLICATIONS

Written Opinion dated Oct. 10, 2016 in corresponding PCT International Application No. PCT/FR2016/051429.

* cited by examiner

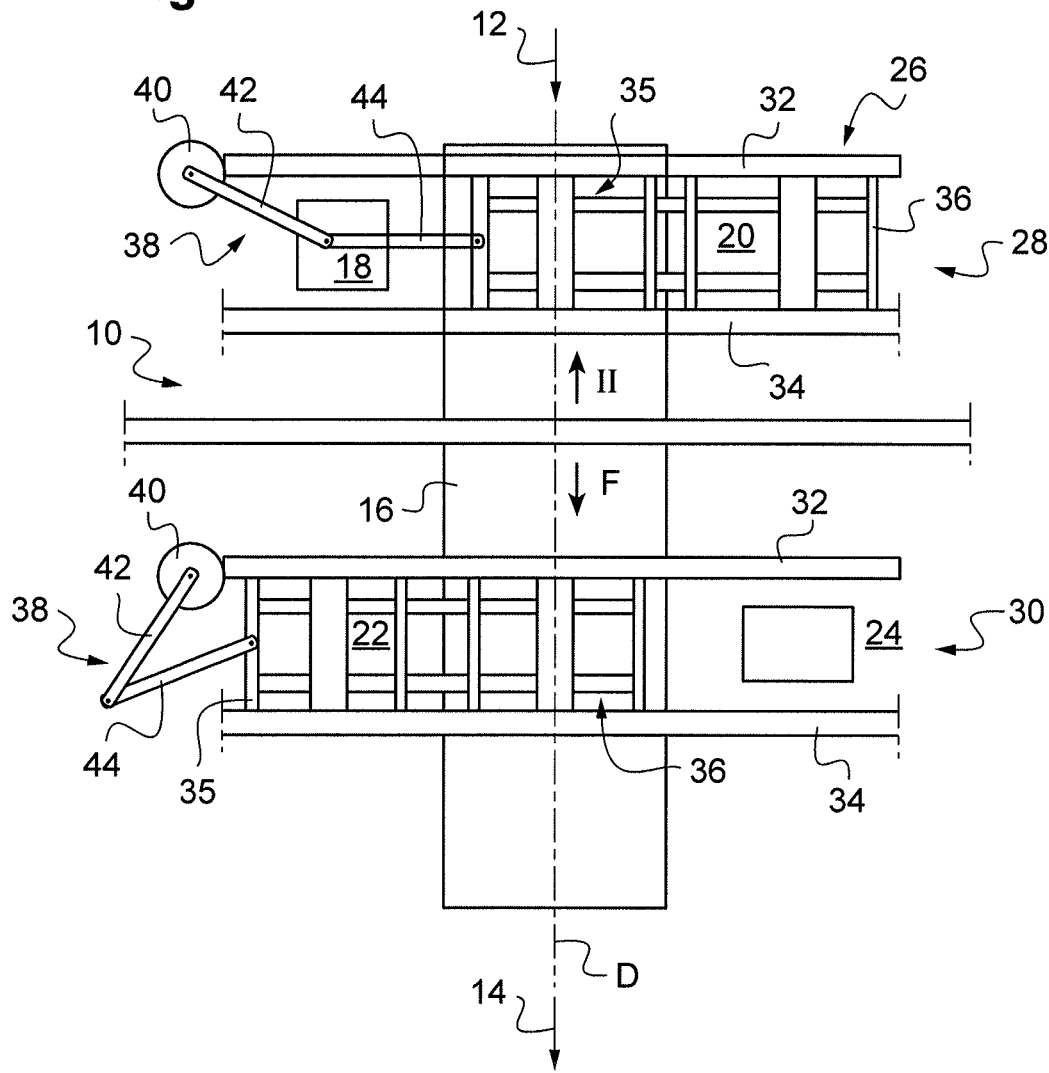
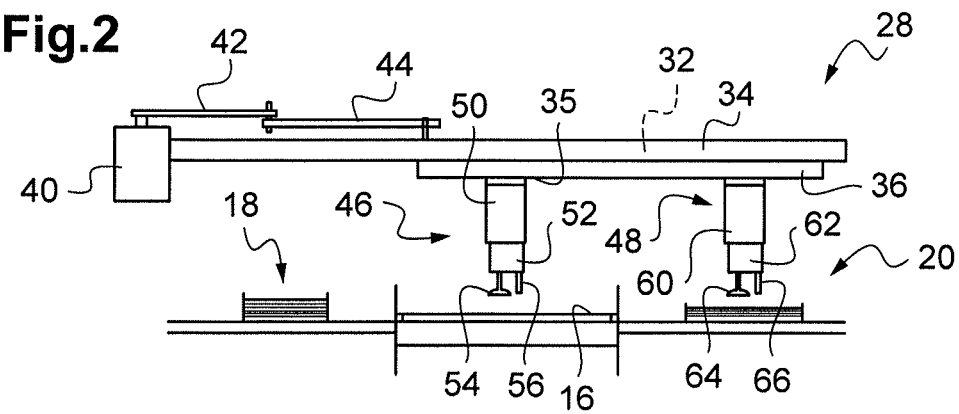

UNIT AND METHOD FOR THE PRODUCTION OF THERMOPLASTIC COMPOSITE PREFORMS

CROSS-REFERENCE TO RELATED APPLICATIONS

The present application is a 35 U.S.C. §§ 371 national phase conversion of PCT/FR2016/051429, filed Jun. 13, 2016, which claims priority to French Patent Application No. 1555399, filed Jun. 12, 2015, the contents of which are incorporated herein by reference. The PCT International Application was published in the French language.

TECHNICAL FIELD

The present invention relates to a unit for the production of thermoplastic composite preforms.

One application field particularly envisaged, although not exclusively, is that of the production of composite parts for motor vehicles that can easily be recycled.

BACKGROUND OF THE INVENTION

Known installations enable the production of composite preforms from thermoplastic composite material tapes. The tapes consist of a thermoplastic polymer material matrix and include reinforcing fibers buried in the polymer material. These tapes are stored as rolls in the vicinity of a mobile support on which tape portions are successively applied and welded together with different orientations. Two tapes of different kinds wound on respective spools are used, for example. After each application of a tape, the mobile support may be driven in rotation so as to be able to apply the next tape in another direction.

Thus by superposing a plurality of tapes two-dimensional preforms are produced with predefined reinforcement zones. These preforms can then be thermoformed in a press provided for this purpose.

See the document WO2013/016487, which describes an installation of this kind.

It will be seen that the production of each preform necessitates the use of a large number of tapes and is therefore relatively lengthy. Moreover, the installation is not able to produce more than one preform at a time. Also, productivity is low.

Also, a problem that arises and that the present invention aims to solve is providing a more productive installation for production of thermoplastic composite preforms.

SUMMARY OF THE INVENTION

To this end, there is proposed an installation for production of thermoplastic composite preforms intended to be thermoformed, said installation comprising on the one hand a mobile support and a plurality of storage areas situated in the vicinity of said mobile support to be able to store a respective plurality of thermoplastic composite material structural elements and of the other hand transfer and connection devices for transferring said structural elements from respective storage areas of said plurality of storage areas to said mobile support and to be able to connect together said structural elements on said mobile support so as to produce a preform. Said mobile support is driven sequentially in translation in a feed direction and said storage areas are arranged laterally relative to said mobile support and said transfer and connection devices transfer said structural elements sequentially onto said mobile support in a transfer direction substantially perpendicular to said feed direction.

Thus one feature of the invention lies in the use of the mobile support, which is drive in translation only in the feed direction. Also, the storage areas being arranged laterally on each side of the mobile support, the transfer and connection devices pick up the structural elements in the respective storage areas to drive them in translation in a direction perpendicular to the feed direction onto the mobile support. The mobile support is driven sequentially in translation, in other words intermittently, so that the structural elements can be connected together on the support. As a result, complementary structural elements will be able to be adjusted as and when the mobile support advances. Also, the shape of the various structural elements that can be assembled will be predefined on the upstream side, as a function of the required preform and, based thereon, the composite part to be produced. Consequently, in contrast to the prior art, in which standard tapes are superposed, this minimizes the number of structural elements to be assembled.

What is more, it is possible to assemble a plurality of preforms simultaneously and progressively on the mobile support between a start and an end. The mobile support comprises a conveyor belt, for example, as explained in more detail hereinafter. Productivity is considerably improved thanks to these features.

According to one particularly advantageous embodiment of the invention, said storage areas are paired, the storage areas of each of the pairs of storage areas being opposite each other relative to said mobile support. As explained hereinafter, this arrangement of the storage areas relative to the mobile support enables more efficient transfer of structural elements.

Moreover, and advantageously, said transfer and connection devices include a plurality of members for holding said structural elements. Also, a holding member is associated with each storage area. The holding members preferably comprise a respective suction cup. As a result, the suction cup is placed against the structural elements so as to be able to pick them up and transfer them to the mobile support. To release them, it suffices to vent the cup as explained hereinafter. According to a variant embodiment, the cup is pressurized so as to release the structural elements more easily.

Moreover, said transfer and connection devices include a plurality of welding members for connecting together said structural elements. The welding members are preferably installed through the suction cup. As a result, when one structural element is adjusted on another, it is welded to said other structural element without releasing it. As a result, the structural elements are adjusted and connected to one another in a precise manner. According to another variant described in more detail in the remainder of the description, the welding members are contiguous with the suction cup.

According to one particularly advantageous embodiment of the invention, the welding members comprise a transducer and a sonotrode. As a result, structural elements are welded together ultrasonically. This method consists in locally melting the thermoplastic material of the structural elements in order to weld them.

Also, said transfer and connection devices further and advantageously include transfer carriages mobile in translation in said transfer direction to be able to transfer said structural elements. The transfer carriages are engaged in transverse slides enabling movement in translation with little friction and consequently at high speed. A transfer carriage is associated with each storage area. Moreover, said transfer and connection devices further include a link/crank system to be able to drive said transfer carriages in translation. Thanks to the link/crank system movement in rotation is transformed into movement in translation enabling the transfer carriages to be moved at high speed. Also, this system enables progressive and controlled acceleration of the carriages, both on departure and on arrival.

According to a particularly advantageous embodiment of the invention, said transfer carriages are mechanically connected two by two. The transfer carriages of two storage areas opposite each other relative to the mobile support are therefore mechanically connected together so that if one of the transfer carriages is driven toward one of the storage areas the other transfer carriage is simultaneously driven from the other storage area toward the mobile support. This minimizes dead times and unnecessary movements of the transfer devices. This improves the productivity of the production of composite material preforms.

Moreover, the installation according to the invention comprises respective arms installed on said transfer carriages. The holding members and the welding members are installed at respective ends of the arms as explained in more detail hereinafter.

The invention also proposes a method for the production of thermoplastic composite preforms intended to be thermoformed, said method being of the type comprising the following steps: there are procured a mobile support and a plurality of storage areas situated in the vicinity of said mobile support to be able to store a respective plurality of thermoplastic composite material structural elements; said structural elements are transferred from respective storage areas of said plurality of storage areas to said mobile support and said structural elements are connected together on said mobile support to produce a preform; and said mobile support is driven sequentially in translation in a feed direction and said storage areas are arranged laterally relative to said mobile support and said structural elements are transferred sequentially onto said mobile support in a transfer direction substantially perpendicular to said feed direction.

There are preferably further procured transfer and connection devices including transfer carriages mobile in translation in a transfer direction substantially perpendicular to said feed direction D to be able to transfer said structural elements sequentially onto said mobile support in said transfer direction.

BRIEF DESCRIPTION OF THE DRAWINGS

Other particular features and advantages of the invention will emerge on reading the following description of one particular embodiment of the invention given by way of nonlimiting illustration with reference to the appended drawings, in which:

FIG. 1 is a partial diagrammatic plan view of an installation according to the invention for production of thermoplastic composite preforms;

FIG. 2 is a diagrammatic front view in the direction of the arrow II shown in FIG. 1 and showing a working unit.

DESCRIPTION OF PREFERRED EMBODIMENTS

Figure 3:
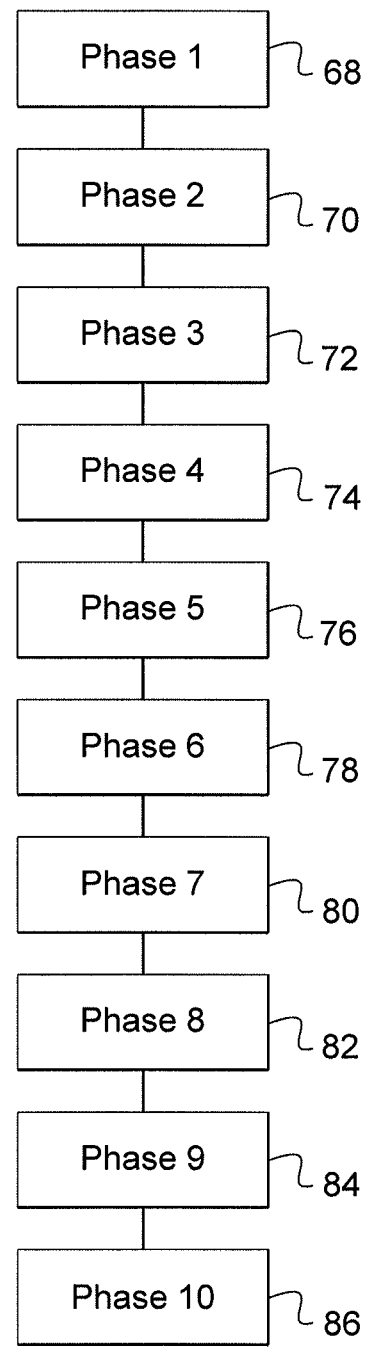
FIG. 3 is a flowchart showing the successive phases of use of the production installation that is the subject matter of the invention.

FIG. 1 shows in plan view an installation 10 for production of thermoplastic composite preforms. It features an entry 12 and opposite it an exit 14. A conveyor belt 16 extends between the entry 12 and the exit 14 and forms a mobile support intended to be driven in translation from the entry 12 to the exit 14 in the direction of the arrow F. It therefore defines a feed direction D. The installation 10 features laterally storage areas 18, 20, 22, 24 arranged laterally on each side of the conveyor belt 16 and face to face two by two. The storage areas 18, 20, 22, 24 are intended to be able to store thermoplastic composite material structural elements. These structural elements have previously been pultruded and cut to length. They can be of different kinds. They are made of polypropylene for example or polyamide and are reinforced for example with glass fibers or carbon fibers. They can also have different thicknesses. Each storage area is therefore adapted to store structural elements of the same predefined shape and the same structure stacked on one another. Other types of storage areas can be envisaged, for example for performing loading in masked time.

The first two storage areas, one area 18 on the right and the other area 20 on the left, are therefore substantially symmetrical to each other relative to the conveyor belt 16 and the second two storage areas, one area 22 on the right and the other area 24 on the left, are also symmetrical to each other relative to the conveyor belt 16. Moreover, the first right-hand storage area 18 contains first first structural elements, the first left-hand storage area 20 contains first second structural elements, and the second right-hand storage area 22 contains second first structural elements and the second left-hand storage area 24 contains second second structural elements.

It will be noted that only two pairs of storage areas 18, 20; 22, 24 are shown in FIG. 1 but that a plurality of pairs of storage areas could be distributed in the same way between the two first storage areas 18, 20 and the two second storage areas 22, 24.

Above the conveyor belt 16 and the storage areas 18, 20; 22, 24 is installed a gantry 26 divided into workstations, a first workstation 28 and a second workstation 30. The workstations 28, 30 extend over the conveyor belt 16 and the two pairs of storage areas 18, 20; 22, 24. The gantry 26 includes for each of the workstations 28, 30 a pair of parallel upper crossmembers 32, 34 extending substantially perpendicularly to the feed direction D and to the conveyor belt 16. Each of the pairs of crossmembers 32, 34 receives two transfer carriages, a proximal carriage 35 and a distal carriage 36 mechanically coupled together in line with each other and mounted to be mobile in translation between the crossmembers 32, 34. The transfer carriages 35, 36 are driven in movement in translation and sequentially by means of a link/crank system 38 including a motor unit 40 intended to drive pivoting of a crank 42 that is connected to one of the transfer carriages, the proximal transfer carriage 35, via a link 44.

The first workstation 28 is seen again in front view in FIG. 2. There are seen again the coupled transfer carriages 35, 36 mounted to be mobile in translation between the parallel upper crossmembers 32, 34, the motor unit 40 and the combination of the link 44 and the crank 42 connecting the proximal transfer carriage 35 to the motor unit 40.

Also seen again are the conveyor belt 16 and, laterally, the two first storage areas 18, 20, opposite each other relative to the conveyor belt 16.

The proximal transfer carriage 35 is equipped with a proximal telescopic arm 46 and the distal transfer carriage 36 is equipped with a distal telescopic arm 48. The telescopic arms 46, 48 extend substantially perpendicularly to the respective transfer carriages 35, 36 and respectively toward the conveyor belt 16 and toward the first left-hand storage area 20.

The proximal telescopic arm 46 includes a proximal body 50 and a proximal rod 52 mounted to slide in the proximal body 50. The free end of the proximal rod 52 is equipped with a proximal suction cup 54 and a contiguous proximal sonotrode 56. In parallel, the distal telescopic arm 48 includes a distal body 60 and a distal rod 62 mounted to slide in the distal body 60. The free end of the distal rod 62 is equipped with a distal suction cup 64 forming a holding member and a contiguous distal sonotrode 66 forming a welding member. It will be seen that a suction cup enables picking the objects up in order to drive them in movement and here it will pick up thermoplastic composite material structural elements. To this end, the cup is pressed hermetically against the plane face of the structural element and a reduced pressure is created inside the cup in order to attach it to the structural element. To release the latter, the cup is then depressurized, i.e. vented to atmospheric pressure, or pressurized for better effectiveness. As for the sonotrode, it is associated with a transducer that is not shown and enables the structural element to be softened and locally melted by means of an ultrasound mechanical wave generated by the transducer.

According to another variant embodiment of the invention that is not shown, the sonotrode is situated inside the suction cup so as to improve the compactness of the holding member and the welding member at the free end of the rod of the telescopic arm. According to a further variant embodiment of the invention that is not shown the sonotrode occupies a central position at the free end of the rod and two suction cups are installed in diametrically opposite positions relative to the sonotrode. Because of this, picking up the structural element is improved, as explained hereinafter.

Here the second workstation 30 shown in FIG. 1 is identical to the first one 28.

A operating cycle of the installation according to the invention is described now with reference to FIG. 3 in a simple situation in which the composite preform includes four structural elements connected together, the four structural elements being initially stored in respective storage areas 18, 20; 22, 24.

This operating cycle is also described with reference to FIGS. 1 and 2.

The first workstation 28 being in an initial state as shown in FIGS. 1 and 2, in a first picking up phase 68, divided into three steps, the distal telescopic arm 48 is activated so that the distal rod 62 is driven to extend it to press the distal suction cup 64 against a first first structural element from the first left-hand storage area 20. The distal suction cup 64 is then depressurized after which the distal rod 62 is retracted so as to pick up the first first structural element.

In a second phase 70 the motor unit 40 of the first workstation 28 is operated to arrive at a state identical to that of the second workstation 30 shown in FIG. 1. As a result, returning to FIG. 2, the first first structural element is carried over the conveyor belt 16 and the proximal suction cup 54 of the proximal telescopic arm 46 is for its part carried over the first right-hand storage area 18.

Then, in a third phase 72 including two simultaneous steps, one of deposition and the other of picking up, themselves divided into substeps, the first first structural element is deposited on the conveyor belt 16 and to this end the distal rod 62 is driven to extend it, after which the distal suction cup 64 is vented to atmospheric pressure and the distal rod 62 is then retracted, and the proximal rod 52 is driven to extend it to press the proximal suction cup 54 against a first second structural element from a first right-hand storage area 18, after which the suction cup 54 is depressurized and the proximal rod 52 is then retracted to be able to pick up the first second structural element.

According to a variant execution, a basic structural element is already carried on the conveyor belt 16 in vertical alignment with the distal telescopic arm 48 carrying the first first structural element. The first first structural element is therefore deposited at least in part on the base structural element in a predefined position and the distal sonotrode 66 comes to press against the first first structural element and is used to weld the first first structural element and the base structural element locally.

In a fourth phase 74 the motor unit 40 of the first workstation 28 is again operated to carry the transfer carriages 35, 36 in their initial state, as shown in FIG. 2. The first second structural element is then carried in line with the first first structural element deposited on the conveyor belt 16 with a predefined relative position and orientation and the distal suction cup 64 of the distal telescopic arm 48 returns to a position above the first left-hand storage area 20.

Then in a fifth phase 76 also including two simultaneous steps, one of deposition and fixing, the other of picking up, both divided into substeps, the first second structural element is on the one hand pressed onto the first first structural element in a predefined relative position thanks to the proximal rod 52 which is driven to extend it and additionally and simultaneously the proximal sonotrode 56 which comes to press against the first second structural element is used to weld the first first structural element and the first second structural element locally. A spring-loaded device preferably enables pressure to be maintained on the structural element during welding. The proximal suction cup 54 is then depressurized and the proximal rod 52 is retracted. In parallel, the distal rod 62 has been driven to extend it and then retract it to pick up another first first structural element as described for the first picking up phase 68.

In a sixth phase 78 the conveyor belt 16 is then driven in translation in the feed direction D and through a given step so as to carry the two first structural elements fastened to each other in vertical alignment with the two transfer carriages 35, 36 of the second workstation 30.

Before the execution of the sixth phase 78, and during the period of use of the first workstation 28 as far as the fifth phase 76, the second workstation 30 has been operated in parallel in accordance with the first phase 68 and the second phase 70.

Starting from this, the distal telescopic arm 48 of the distal carriage 36 of the second station 30 has been activated to pick up the second first structural element contained in the second left-hand storage area 24. The motor unit 40 of the second workstation 30 is then operated to carry the second first structural element over the conveyor belt 16 and the proximal suction cup 54 of the proximal telescopic arm 46 of the proximal carriage 35 of the second station 30 is for its part carried over the second right-hand storage area 22.

Accordingly, when the two first structural elements fastened together come into vertical alignment with the two transfer carriages 35, 36 of the second workstation 30, the second first structural element carried by the distal telescopic arm 48 is in line with the two first structural elements fastened together in a predefined relative position.

Then, in a seventh phase 80 similar to the third phase 72 for the first workstation 28 but further including a welding operation the second first structural element is pressed onto the two first structural elements fastened together and the distal sonotrode 66 which comes to press against the second first structural element is operated to weld the second first structural element to one or the other of the two first structural elements fastened together locally. In parallel, the proximal telescopic arm 46 of the proximal transfer carriage 35 of the second station 30 is activated to pick up a second second structural element contained in the second right-hand storage area 22.

Then in a eighth phase 82 corresponding to the fourth phase 74 for the first workstation 28 the motor unit 40 of the second workstation 30 is operated again. The second second structural element is then carried in line with the second first and two first structural elements fastened together.

In a ninth phase 84 analogous to the fourth phase for the first workstation 28 and also including two simultaneous steps, one of deposition and fixing, the other of picking up, both divided into substeps, the second second structural element is on the one hand pressed onto the second first and two first structural elements in a predefined relative position and the proximal sonotrode 56 that comes to press against the second second structural element is simultaneously operated to weld it locally to one or the other of the second first and two first structural elements. Furthermore, the distal telescopic arm 48 simultaneously comes to pick up a second first structural element contained in the second left-hand storage area 24.

There is obtained in this way a preform consisting of four thermoplastic composite structural elements fastened together.

Of course, simultaneously with the execution of the seventh phase 80, eighth phase 82 and ninth phase 84, the first workstation 28 has been operated in accordance with the first phase 68 to the fifth phase 76.

Consequently, and in a tenth phase 86, the conveyor belt 16 is again driven in translation in the feed direction D and over said given step so as to carry toward the exit 14 the preform formed in this way and also to carry two new first structural elements fastened together into vertical alignment with the two transverse carriages 35, 36 of the second workstation 30.

Thus thermoplastic composite preforms are produced continuously, here comprising four structural elements, at the rhythm of a forward step of the conveyor belt 16. Each thermoplastic composite preform is then placed in a press in order to be thermoformed.

Also, it is clear that the number of workstations can be greater than two if the composite preforms are more complex and integrate other structural elements.

Moreover, thanks to the production installation according to the invention it is possible to use structural elements made of thermoplastic composite materials of different kinds, with different orientations and also with different levels of thickness. The preforms produced using this installation can be produced using less material.

Thanks to the installation according to the invention thermoplastic composite preforms are produced with a high throughput, for example one per minute, with good reproducibility.

The invention claimed is:

1. An installation for production of thermoplastic composite preforms intended to be thermoformed, said installation comprising a mobile support that includes a conveyor with a surface and a plurality of storage areas situated in the vicinity of said mobile support to be able to store a respective plurality of thermoplastic composite material structural elements and transfer and connection devices for transferring said structural elements from respective storage areas of said plurality of storage areas to said surface of said conveyor of said mobile support and connecting together said structural elements on said surface of said conveyor of said mobile support so as to be able to produce a preform;

wherein said mobile support is driven sequentially in translation along a feed path in a feed direction and said storage areas are arranged laterally relative to said mobile support, and in that said transfer and connection devices include transfer carriages mobile in translation along a transfer path in a transfer direction over said surface of said conveyor of said mobile transport transverse to said feed direction to transfer said structural elements sequentially onto said surface of said conveyor of said mobile support in said transfer direction, wherein said conveyor transports said structural elements from an entry to an exit along said feed path under said transfer path;

wherein said storage areas are paired, the storage areas of each of the pairs of storage areas being opposite each other relative to said mobile support, wherein said transfer carriages are mechanically connected two by two, and wherein if one of the transfer carriages is driven toward one of the storage areas the other transfer carriage is simultaneously driven from the other storage area toward the mobile support.

2. The installation as claimed in claim 1, wherein said transfer and connection devices include a plurality of members for holding said structural elements.

3. The installation as claimed in claim 2, wherein the holding members comprise a respective suction cup.

4. The installation as claimed in claim 1, wherein said transfer and connection devices include a plurality of welding members for connecting together said structural elements.

5. The installation as claimed in claim 4, wherein the welding members comprise a transducer and a sonotrode.

6. The installation as claimed in claim 1, wherein said transfer and connection devices further include a link/crank system to be able to drive said transfer carriages in translation.

7. The installation as claimed in claim 1, further comprising respective arms installed on said transfer carriages.

8. The installation as claimed in claim 1, wherein said transfer direction is perpendicular to said feed direction.

9. A method for the production of thermoplastic composite preforms intended to be thermoformed, said method being of the type comprising the following steps:

procuring a mobile support and a plurality of storage areas, the mobile support comprising a conveyor having a surface;

situating said plurality of storage areas in the vicinity of said mobile support to be able to store a respective plurality of thermoplastic composite material structural elements;

transferring said structural elements with transfer carriages from respective storage areas of said plurality of storage areas to said mobile support along a transfer path, connecting said structural elements together on said surface of said conveyor of said mobile support to produce a preform;

driving said mobile support sequentially in translation along a feed path in a feed direction under said transfer path; and arranging said storage areas laterally relative to said mobile support, wherein said structural elements are transferred sequentially onto said surface of said conveyor of said mobile support along said transfer path in a transfer direction transverse to said feed direction, wherein said storage areas are paired, the storage areas of each of the pairs of storage areas being opposite each other relative to said mobile support, wherein said transfer carriages are mechanically connected two by two, and wherein if one of the transfer carriages is driven toward one of the storage areas the other transfer carriage is simultaneously driven from the other storage area toward the mobile support.

10. The production method as claimed in claim 9, further comprising procuring transfer and connection devices including transfer carriages mobile in translation in a transfer direction transverse to said feed direction to be able to transfer said structural elements sequentially onto said mobile support in said transfer direction.

11. The installation as claimed in claim 10, wherein said transfer direction is perpendicular to said feed direction.

12. The installation as claimed in claim 9, wherein said transfer direction is perpendicular to said feed direction.

* * * * *